April 7, 1953 J. K. WEDDELL 2,634,338

TELEPHONE ATTACHMENT

Filed Feb. 12, 1952

Inventor
Joseph K. Weddell

By Ross & Ross
Atty & Agent

Patented Apr. 7, 1953

2,634,338

UNITED STATES PATENT OFFICE 2,634,338

TELEPHONE ATTACHMENT

Joseph Kennard Weddell, Longmeadow, Mass.

Application February 12, 1952, Serial No. 271,107

3 Claims. (Cl. 179—146)

My invention relates to a telephone attachment and more particularly to a device which is adapted to be seated upon the top of a telephone base or desk set and to receive and retain the hand set in any one of a plurality of directions relative to the desk set.

The principal object of my invention is to provide a means whereby a telephone hand set may be placed on a telephone base and relative thereto at an angle opposed to the conventional position. That is to say, as is commonly known, hand sets today are disposed transversely of the desk set and over the top side thereof in a side-to-side manner.

As is also well known, depending upon the particular location of the telephone set, which location may be determined or controlled by the surrounding area so as to offer only a minimum of space for the telephone set, it is not always most convenient to place the hand piece in the conventional side-to-side manner. That is to say, in many instances were it mechanically practical to do so, it would be still more practical and/or convenient to place the hand piece in a front-to-rear manner where the receiver end, or the microphone end, of the hand set would be disposed directly over the dial number of the desk set and the opposite end would be disposed over the rear or back of the desk set, or vice versa.

Further, in many instances, even where space or lack of it is not a primary consideration, it would be more convenient for the user of the telephone to place the hand set in the aforementioned front-to-rear position instead of in the conventional side-to-side manner due to a variety of reasons, including, among others, the reason that the normal position of the user relative to the telephone set is such that it would be easier for him to grasp a hand set disposed in the front-to-rear position.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figures 1, 2, 3:
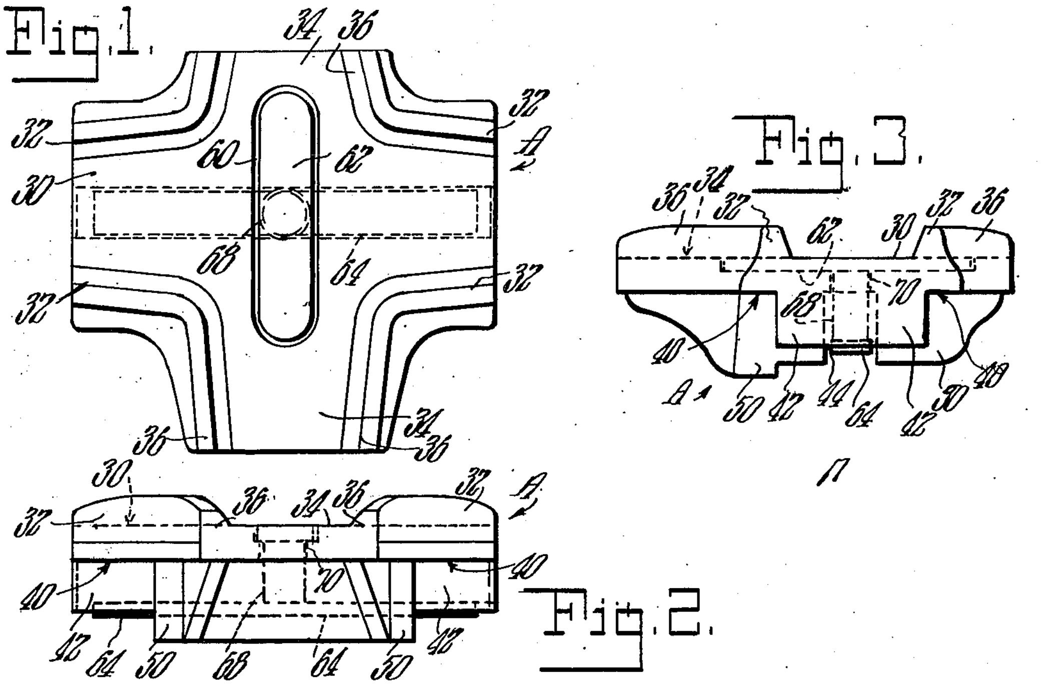
Fig. 1 is a top plan view of the device of my invention.
Fig. 2 is a side elevational view of the device shown in Fig. 1.
Fig. 3 is an end elevational view of the device shown in Fig. 1.

Referring now to the drawings more in detail, the invention will be fully described.

Figure 4:
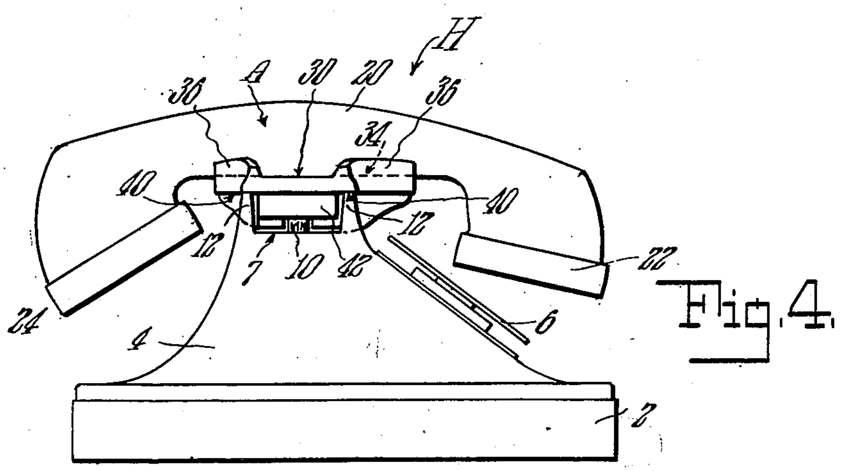
Fig. 4 is a side elevational view of a complete telephone set showing the device of my invention in association therewith.

I have shown in Fig. 4 a conventional desk telephone comprising a telephone and a hand set.

The desk set includes a base 2 and a body 4 having on the front side thereof a dial member 6 of the well known construction and design.

Located on the top of the body 4 is a ledge 7 in which are reciprocable the conventional depressible control buttons 10 which close and open the circuit as they are pressed downwardly by the main body portion 20 of the hand set which is generally designated by H, or released as the same is removed therefrom, all as is well known in the art.

Likewise conventional are the spaced pairs of horn members 12 which extend vertically upwardly from the ledge 7 to provide a cradle within which the hand set may be placed when not in use.

The aforementioned hand set H is of the well known design and, in addition to the main body portion 20, which is adapted to be manually engaged, includes a receiver or ear piece 22 and a microphone 24 at its opposite extremities.

The device of my invention comprises a body or support member which is generally indicated by A.

On the upper side thereof a channel 30 is provided thereacross by means of ridges 32 on opposite sides thereof which extend upwardly above the plane thereof.

A cross channel 34 is also provided on the upper side of the body member and is formed by means of ridges 36 on opposite sides thereof which also extend upwardly above the plane thereof.

The channels 30 and 34 are of such dimension as to receive the main body portion 20 of the hand set H in a manner similar to the manner in which it is now receivable on the top of the conventional desk set, the ridges serving to form the cradle within which the hand set rests.

The channel 30 and cross channel 34 are disposed at right angles to each other and merge into each other or intersect as do the ridges 32 and 36 merge into each other, all as will be appreciated by reference to the top plan view (Fig. 1).

It will thus be appreciated that the hand set may be disposed in the channel 30 or in a position transverse thereof in the channel 34.

The underside of the body member A provides ledges 40 which are disposed beneath the ridges 32 by virtue of a pair of shoulder portions 42 which extend downwardly away from the body member along an axis parallel to the channel 30 and on opposite sides thereof.

The ledges 40 are adapted to seat upon the tops of the horns 12 of the desk set.

The shoulder portions 42 are spaced so as to provide a slot 44 therebetween.

If desired, other supporting means such as legs 50 and braces 51 may be provided so as to give strength to the structure. The legs 50 are of such dimension as to extend downwardly from the body member A so as to be on or adjacent the ledge 7 of the desk set when the body member is rested upon the horns 12. The braces 51 may extend outwardly from the legs 50 and/or the shoulder portions 42 and upwardly to the outer extremities of the body member A and beneath the channels 30 and/or 34 thereby lending strength to the body member A and the components thereof.

The cross channel 34 is provided with an elongated longitudinal shallow groove or recess 60 adapted to receive loosely therein a hand set engaging member 62. The member 62 is of such dimension as to nest within the groove 60 in such a manner that its upper surface is flush with the bottoms of the intersecting channels 30 and 34 as will be seen by reference to Fig. 3.

A button engaging member 64 is receivable in the slot 44 between the shoulder portions 42 and extends along an axis parallel to the channel 32 and transverse to the channel 30 and the member 62.

Members 62 and 64 are connected by means of a staff member 68 which extends downwardly from member 62 through an opening 70 centrally of the intersecting channels 30 and 34.

The button engaging member 64 is of such dimension as to rest upon and bear against the buttons 10 as the device of the invention is seated on the top of a desk set in the manner aforementioned.

It will be appreciated that the device of my invention supports the hand set which actuates the buttons 10 as the button engaging member 64 is depressed so as to bear downwardly upon the buttons 10.

The buttons 10 urge the member 64 upwardly unless and until a hand set A is placed upon the device of the invention at which time the weight thereof is sufficient to depress the member 62 and accordingly the member 64 downwardly whereby the member 64 depresses the buttons 10 downwardly.

The hand set may be disposed either in channel 30 or in channel 34 depending upon the location of the telephone set relative to the user so that the user may use whichever channel is most convenient for him to use in locating the hand set relative to the desk set when not in use.

When in use, the lower button engaging member 64 engages the buttons 10 and urges them downwardly as the hand set engaging member 62 is engaged by the hand set and is depressed downwardly thereby. This will be so whether the hand set is placed in one or the other of the intersecting channels 30 and 34.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device for supporting a hand set of a desk telephone and actuating the control buttons disposed between the spaced pairs of spaced vertically extending horns thereof comprising, a member for disposition between the horns having ledges for resting thereon and having on its upper side intersecting channels disposed in right angular relation and adapted to receive a hand set, a staff member reciprocable vertically in said member and disposed centrally of the channels, and a lower button engaging member on the lower end of said staff for engaging the buttons and an upper member on the upper end of said staff for engagement by the hand set, all adapted and arranged whereby a hand set may be placed in either of the channels to bear on the upper member for depressing the buttons by said lower button engaging member.

2. A device for the upper side of a desk telephone having spaced pairs of relatively spaced vertically extending horns for supporting a hand set and depressing the control buttons disposed between the horns of said telephone comprising, a support member formed for disposition on the upper side of the telephone and between the horns thereof and provided with channels on the upper side thereof for receiving a hand set and being disposed right angularly relative to one another and intersecting between said horns and the pairs thereof, a staff reciprocable vertically in said support member, a lower elongated button engaging actuator on the lower end of said staff, and an upper hand set engaging member on the upper end of said staff, all adapted and arranged whereby a hand set may be supported in either of said channels to bear on said upper member and through said staff depress said buttons by said lower member.

3. A device for supporting a hand set of a desk telephone and actuating the control buttons disposed over the vertically extending horns thereof comprising, a member for disposition between the horns having means for resting thereon and having on its upper side intersecting channels disposed in right angular relation and adapted to receive the hand set, a staff member reciprocable vertically in said member and disposed centrally of the channels, a lower button engaging member on the lower end of said staff member for engaging the buttons, and an upper member on the upper end of said staff member for engagement by the hand set, all adapted and arranged whereby the hand set may be placed in either of the channels to bear on said upper member for depressing the buttons by said lower button engaging member.

JOSEPH KENNARD WEDDELL.

REFERENCES CITED

The following references are of record in the file of this patent:

UNITED STATES PATENTS

| Number | Name | Date |
|---|---|---|
| 2,541,712 | Neblett | Feb. 13, 1951 |